Patented May 5, 1925.

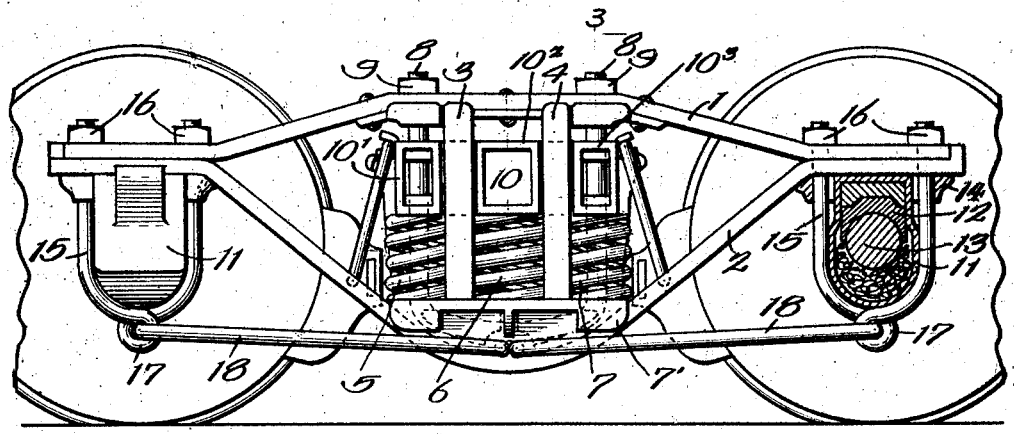
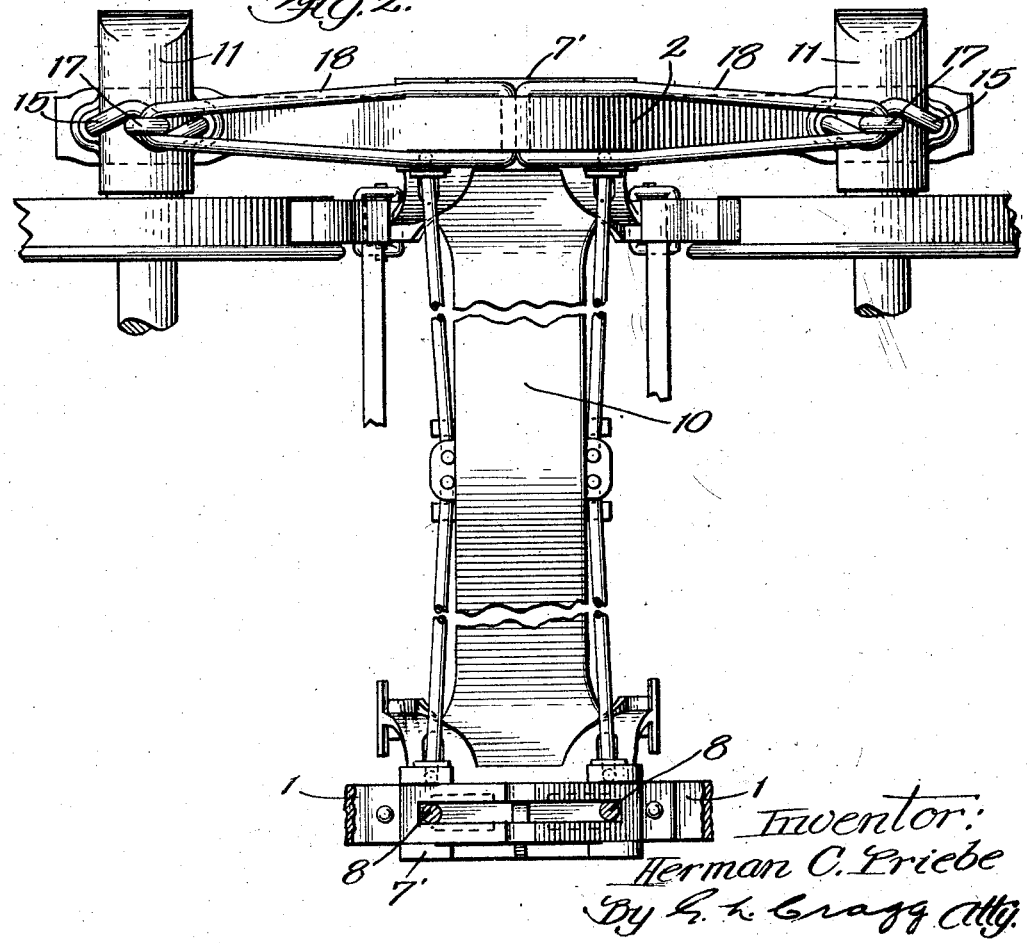

1,536,138

UNITED STATES PATENT OFFICE.

HERMAN C. PRIEBE, OF BLUE ISLAND, ILLINOIS.

RAILROAD-CAR TRUCK.

Application filed February 12, 1924. Serial No. 692,368.

*To all whom it may concern:*

Be it known that I, HERMAN C. PRIEBE, a citizen of the United States, residing at Blue Island, in the county of Cook and the State of Illinois, have invented a certain new and useful Improvement in Railroad-Car Trucks, of which the following is a full, clear, concise, and exact description.

My invention relates to car trucks and resides in the employment of U bolts for assembling the journal boxes with the car truck side frames. The sides of each U bolt that performs such a function are placed in the plane of the contiguous side frame so that the U bolt in conjunction with the side frame with which it is assembled may define space for receiving the associate journal box.

Where the side frames are formed with assembled upper and lower arch bars the U bolts also preferably take part in maintaining these arch bars in assembly at the ends of the truck. The bases of the U bolts desirably underlie the journal boxes and are preferably formed with eyes which receive tie rods that assemble the bases of the U bolts with the mid and underlying portions of the side frames.

The invention will be more fully explained in connection with the accompanying drawing in which Fig. 1 is a side view of a car truck constructed in accordance with the preferred embodiment of the invention; and Fig. 2 is a view from beneath illustrating a portion of the car truck.

Like parts are indicated by similar characters of reference throughout both figures.

The truck side frame illustrated includes an upper arch bar 1, a lower arch bar 2, and the bolster guide bars 3 and 4. Each side of the truck has such a side frame. As the drawing only illustrates the complete construction at one side of the truck, the construction of but one side will be alone described, it being understood that such description pertains to the construction at each side.

Upright truck bolster supporting springs 5, 6 and 7 are located between the arch bars and in the general plane thereof. These springs are seated upon the seat 7′ carried upon the lower arch bar. The upright U bolt 8 which serves to define the positions of the springs 5 and 7 has its base below the seat 7′ and its sides passing through the upper arch bar with which the bolt is held in assembly by means of its nuts 9 threaded upon the upper ends of the bolt sides. The truck bolster 10 is formed into three fork branches 10′, 10², 10³ at each end. The sides of the U bolt 8 pass upwardly through the outer springs 5 and 7 and the truck bolster branches 10′, 10³. The middle truck bolster branch 10² is disposed between the guide bars 3 and 4 while the truck bolster branches 10′, 10³ are upon the outer sides of these guide bars, this structure forming the subject matter of another application, Serial No. 692,369, filed Feb. 12, 1924.

In the structure shown, the arch bars are brought together at the ends of the frame above the journal boxes 11 that enclose, each, the bearing block 12 resting upon the corresponding car axle 13. The upper portion of each journal box is formed with a top flange 14 having upright apertures, spaced apart longitudinally of the truck, through which the upright sides of the U bolt 15 are passed. The base of this U bolt underlies the journal box, this U bolt base and the sides of the U bolt closely embracing the portion of the associate journal box that extends downwardly from the car axle. The nuts 16 upon the upper ends of the U bolts are screwed firmly down upon the upper arch bar and serve to clamp the adjacent ends of the arch bar in assembly with each other and in assembly with the corresponding journal box.

Each U bolt 15 is formed with an eye 17 on its base, this eye being preferably formed by suitably curling the rod from which the U bolt 15 is made.

Linkage assembles the U bolts 15 with the side frame, such linkage preferably inincluding two chainlike links 18 whose outer ends are received in the eyes 17 and whose inner ends are firmly held between the spring seat 7 and the lower arch bar 2 at the mid and bottom portion of the side frame.

It is obvious that changes may be made without departing from the spirit of my invention.

Having thus described my invention I claim as new and desire to secure by Letters Patent the following:—

1. A car truck including the side frame thereof; a journal box; a U bolt assembled with the side frame and defining therewith a space in which the journal box is received; and a link connecting the U bolt with a remote portion of the truck.

2. A car truck including the side frame thereof that contains upper and lower arch bars; a journal box above which ends of said arch bars are disposed; a U bolt assembling said ends of the arch bars and defining with the lower arch bar a space in which the journal box is received; and a link connecting the U bolt with a remote portion of the truck.

3. A car truck including the side frame thereof; a journal box; a U bolt assembled with the side frame and defining therewith a space in which the journal box is received; and a link connecting the base of the U bolt with a remote portion of the truck.

4. A car truck including the side frame thereof that contains upper and lower arch bars; a journal box above which ends of said arch bars are disposed; a U bolt assembling said ends of the arch bars and defining with the lower arch bar a space in which the journal box is received, said U bolt being arranged with its base beneath the journal box; and a link connecting the base of the U bolt with a remote portion of the truck.

5. A car truck including the side frame thereof; a journal box; a U bolt assembled with the side frame and defining therewith a space in which the journal box is received, said U bolt being arranged with its base beneath the journal box, the U bolt base having an eye formed thereon; and a link assembled with the eye of the U bolt and a remote portion of the car truck.

6. A car truck including the side frame thereof that contains upper and lower arch bars; a journal box above which ends of said arch bars are disposed; a U bolt assembling said ends of the arch bars and defining with the lower arch bar a space in which the journal box is received, said U bolt being arranged with its base beneath the journal box, the U bolt base having an eye formed thereon; and a link assembled with the eye of the U bolt and a remote portion of the car truck.

7. A car truck including the side frame thereof; a journal box; a U bolt assembled with the side frame and defining therewith a space in which the journal box is received, a portion of the U bolt having an eye formed thereon; and a link assembled with the eye of the U bolt and a remote portion of the car truck.

8. A car truck including the side frame thereof that contains upper and lower arch bars; a journal box above which ends of said arch bars are disposed; a U bolt assembling said ends of the arch bars and defining with the lower arch bar a space in which the journal box is received, a portion of the U bolt having an eye formed thereon; and a link assembled with the eye of the U bolt and a remote portion of the car truck.

9. A car truck including the side frame thereof; a journal box; a U bolt assembled with the side frame and defining therewith a space in which the journal box is received; and a link connecting the U bolt with a mid portion of the side frame.

10. A car truck including the side frame thereof that contains upper and lower arch bars; a journal box above which ends of said arch bars are disposed; a U bolt assembling said ends of the arch bars and defining with the lower arch bar a space in which the journal box is received; and a link connecting the U bolt with a mid portion of the side frame.

11. A car truck including the side frame thereof; a journal box; a U bolt assembled with the side frame and defining therewith a space in which the journal box is received; and a link connecting the base of the U bolt with a mid portion of the side frame.

12. A car truck including the side frame thereof that contains upper and lower arch bars; a journal box above which ends of said arch bars are disposed; a U bolt assembling said ends of the arch bars and defining with the lower arch bar a space in which the journal box is received, said U bolt being arranged with its base beneath the journal box; and a link connecting the base of the U bolt with a mid portion of the side frame.

13. A car truck including the side frame thereof; a journal box; a U bolt assembled with the side frame and defining therewith a space in which the journal box is received, said U bolt being arranged with its base beneath the journal box, the U bolt base having an eye formed thereon; and a link assembled with the eye of the U bolt and a midportion of the side frame.

14. A car truck including the side frame thereof that contains upper and lower arch bars; a journal box above which ends of said arch bars are disposed; a U bolt assembling said ends of the arch bars and defining with the lower arch bar a space in which the journal box is received, said U bolt being arranged with its base beneath the journal box, the U bolt base having an eye formed thereon; and a link assembled with the eye of the U bolt and a midportion of the side frame.

15. A car truck including the side frame thereof; a journal box; a U bolt assembled with the side frame and defining therewith a space in which the journal box is received, a portion of the U bolt having an eye formed thereon; and a link assembled with the eye of the U bolt and a midportion of the side frame.

16. A car truck including the side frame thereof that contains upper and lower arch bars; a journal box above which ends of said arch bars are disposed; a U bolt assembling said ends of the arch bars and defining with the lower arch bar a space in which the journal box is received, a portion of the U bolt having an eye formed thereon; and a link assembled with the eye of the U bolt and a mid portion of the side frame.

In witness whereof, I hereunto subscribe my name.

HERMAN C. PRIEBE.